3,505,078
PROCESS FOR PREPARING A HONEY-GRAHAM FLAVORED CEREAL

Bohdan O. Hreschak, Hawthorne, N.J., assignor to National Biscuit Company, a corporation of New Jersey
No Drawing. Filed Aug. 22, 1966, Ser. No. 573,826
Int. Cl. A23l 1/10
U.S. Cl. 99—83      13 Claims

ABSTRACT OF THE DISCLOSURE

A non-baked, honey-graham flavored, quick-cooking cereal product is produced by mixing a syrup containing honey and sodium-bicarbonate with wheat flour, followed by cooking, drying and comminuting to the desired size.

---

This invention relates the new breakfast cereals, and more specifically to breakfast food of the type which is cooked by the consumer for a short period of time, before use.

Conventional cereals such as, for instance, farina, require cooking for a considerable period of time, in a relatively large volume of water, with frequent stirring to prevent scorching. The time involved and care required have greatly contributed to the development of other varieties of cereals, such as the ready-to-eat type, the quick-cooking cereals, and the instant cereals. The ready-to-eat cereals can be mixed with a cold liquid, usually milk, and can be eaten immediately, without cooking. The instant cereals hydrate immediately upon addition of boiling water and require no cooking. The third variety, the quick-cooking cereals, are marketed in a dehydrated condition, and must be cooked in a liquid, usually boiling water, for a short period of time, before eating.

In spite of the conveniency and popularity of all these varieties of cereals, they are very different in flavor, mouth feel, appearance and consistency, from the conventional hot cereals, which require prolonged cooking. For instance, the ready-to-eat cereals are steamed, passed over heated rolls, or exploded in a moist atmosphere or in a vacuum, to achieve a high degree of gelatinization and hydration, before reaching the consumer. During these steps, manifestly, considerable loss of flavor results.

Also in the case of the instant and quick-cooking cereals available on the market, most of the processes known in the art involve prolonged cooking, prior to reaching the consumer. During this step, considerable loss of natural flavoring agents and valuable nutrients, mainly vitamins and other minerals, occurs. Another disadvantage of most quick-cooking cereals, is that the end products have a tendency to lump and become pasty.

In an attempt to obviate these disadvantages, several suggestions have been made, which have met with at least partial success. For instance, as early as 1916, U.S.P. 1,175,407 described a process for coating cereals with a crystallized honey-sugar candy, to improve the flavor. Very recently, U.S.P. 3,113,868 describes a process for the preparation of cereals which remain paste-free on prolonged cooking, by the incorporation of edible, chemically saturated monoglycerides, in a proportion of 0.3 to 3% of the dry weight of the cereal. The glycerides, according to this patent, are selected from the group containing fatty acid moieties with 8 to 22 carbon atoms. The glycerides are added at least at the time of cooking, but may be added at any stage of the manufacturing process, for instance during roasting or grinding.

The process of U.S.P. 2,930,697 covers the production of quick-cooking cereal products, by soaking the grain, flattening and compressing the material, so that the endosperm becomes exposed and water can penetrate more easily, gelatinizing the starch by cooking, and finally drying. It is there stated that, as a result of the controlled gelatinization of the starch granules, the swollen grain can be dried to produce an enlarged porous vesicular structure. One advantage of this process is that loss of vitamins and minerals is reduced, because the grain can be rehydrated in a minimum of hot water and because nutritive integuments adhere to the endosperm and are not lost during the cooking step.

U.S.P. 2,999,018 describes a process for the preparation of an instant rolled oat food product, with improved flavor and texture characteristics. The process consists of adding to rolled oats one of the edible plant gums, for instance mucilages, or a synthetic gum, such as carboxymethyl cellulose, whereby the cereal acquires the flavor and texture characteristics of cooked oatmeal, upon the addition of hot water. The resulting product has the consistency and appearance of a porridge.

In spite of the efforts and considerable improvement made, the quick-cooking and instant cereal products available on the market, are not totally satisfactory. Particularly in the case of oats, the high degree of comminution necessary to obtain flakes of appropriate size, causes some of the natural oil to come to the surface, with the result that the finished product becomes susceptible to oxidation and rancidity, when exposed to air. Other shortcomings are that, in the attempt to obtain a precooked cereal, which is reconstituted rapidly in boiling water, as the instant cereals, or which needs only a very short cooking time, as the quick-cooking cereals, the end products lose the granular identity, are pasty, or similar to a porridge, become gelatinous on standing and are inferior in organoleptic properties to the conventional hot cereals. Another drawback is that both, the quick-cooking and instant cereals, do not provide sufficient variety of flavors.

One object of this instant invention is to impart to cereal products the flavor commonly called "Graham" or "Honey Graham," which is found in some baked goods such as graham crackers or graham bread. Thus one object is to provide a process whereby the characteristic popular flavor of graham products is achieved in breakfast food, without baking or toasting.

Another object of the invention resides in the provision of a cereal product which requires the minimum proportion of water or milk during cooking by the ultimate consumer, which has no tendency to lump and cake, even on prolonged standing, which is characterized by unusual stability in texture, and which contains a sufficient amount of sweetening agents so that addition of sugar by the consumer is not needed.

Another object of this invention is to provide a method of processing of cereals which have a high starch content, whereby a high proportion of the starch in the end product is uniformly partially gelatinized, and the time required for cooking for human consumption, may be substantially shortened.

Still another object of this instant invention is to prepare cereals from wheat flour rather than from the entire wheat or from fractions of wheat grain. Several advantages result from the use of the wheat flour as it will be demonstrated hereinafter. The ingredients are better blended, the starch is uniformly gelatinized, with less cooking time, coagulation and agglomeration are avoided and the texture of the end product is granular rather than pasty.

A further object of the invention is to provide a simple economical process whereby the breakfast food products may be manufactured on a large scale.

The term "Graham" or "Honey Graham" flavor is associated in the art with products prepared by baking, which have a light brown color with a characteristic nut-like, toasted wheat flavor, having a sweet molasses and honey background. Although some differences exist in the formulations of graham crackers used by the several manufacturers, the essential ingredients of a standard composition are the same, namely, whole wheat flour, sugar, invert syrup or molasses, salt, water and shortening. Some manufacturers use honey instead of invert syrup and molasses, to improve the flavor. Sufficient sodium bicarbonate is added to adjust the pH of the blend to between 7.2 and 8.0. The length of baking time for graham crackers ranges between 4 and 6 minutes, that is, somewhat longer than most other crackers, for instance soda crackers which only require between 3 and 5 minutes.

It has been a common belief in the art that the characteristic graham flavor defined above, could not be achieved except in foodstuffs prepared by baking. It has also been a common belief that whole wheat flour is an essential ingredient of foodstuffs characterized by the "Graham" flavor. Thus, it has been surprising, as it will be demonstrated below, that, according to the process of this invention, breakfast food products characterized by the popular and distinctive flavor known as graham flavor, may be prepared without baking. It has also been surprising that the characteristic flavor may be achieved by substituting white wheat flour for whole wheat flour, in whole or in part.

In summary, this invention presents novel features both as a composition of matter, and as a process. As a composition of matter, the invention comprises certain ingredients in specified proportions, as it will be described below, which give a quick-cooking cereal having the characteristic honey graham flavor, From a process point of view, this invention comprises certain steps of mixing, heating, drying, comminuting, which, when taken in the sequence and carried out in the manner as described, produce the novel product.

According to the conventional processes for the preparation of quick-cooking cereals, the cereal grains either in grit or dough form, are cooked at a moisture ranging from 30 to 50%, for at least one hour, in the presence of flavoring agents such as sugar, salt, and malt. The proportion of the sweetening agents is, at the most, 5 to 10%. Cooking is customarily carried out by subjecting the ingredients to steam in a pressure cooker, where the material becomes gelantinized under pressure ranging from 10 to 100 p.s.i.g. The cooked material is then dried, tempered and flaked.

One feature of this instant invention resides in the finding that, by the use of wheat flour, rather than the wheat grain, it is possible to shorten the cooking period, as it will be described more fully hereinafter. Another feature of the invention resides in the finding that a substantial proportion of sweetening agents, sugar, honey, molasses, invert syrup, may be incorporated into the composition, in the proportion between 27 and 35% of the total composition, without destroying their natural flavor because of the shorter cooking time.

Still another feature of this invention is to keep the pH of the composition between 6.5 and 8. Without speculating upon the mechanism of the reaction and the factors contributing to the development of the honey graham flavor in the finished products, the pH range between 6.5 and 8 is essential to the development of the desired flavor.

The composition in accordance with this instant invention, comprises 30 parts of flour, between 8 and 11 parts of sugar, preferably 9 parts of sugar, between 3 and 6 parts of liquid honey, preferably 4 parts, between 0.2 and 0.3 part of salt, between 0.1 and 0.2 part of sodium bicarbonate, and between 2 and 4 parts of water. The use of flavoring agents such as vanillin, in amount between 0.003 and 0.004 part, is optional. The flour is preferably straight grade flour, of protein content between 8.5 and 11. A portion of the flour, 50% of the total amount, may be whole wheat flour, with the remainder being white wheat flour. It is also possible to use all white wheat flour, without substantially changing the flavor and the properties of the finished food products.

Sorbitol may be used, in partial replacement of the sugar, up to 4-5 parts of sorbitol, in combination with about 5 parts of sugar. Although honey gives the best product, invert syrup or molasses may be used in partial replacement of honey, up to 50% of the honey.

According to the preferred embodiment of the invention, a binder is added, in amount between 0.3 and 0.6 part per 30 parts of flour. The binder may be starch or an edible polysaccharide gum, such as the plant mucilages, agar, algin or gum arabic, or mixtures of same. The use of the binder is advantageous to give a product with the proper consistency and desirable texture, after cooking by the ultimate consumer.

Although it is possible to mix all the ingredients together, it is preferable to add the binder to the flour, if a binder is used, and separately add honey, molasses, if both are used, sugar or sorbitol, sodium bicarbonate, salt, to water, to form a syrup, and then add the syrup to the flour and binder. The material is then blended under mechanical mixing, for a period of time between 1 and 10 minutes, depending upon the size of the mixing unit, the amount of material used and the speed of mixing. Mixing is continued until the material acquires a uniform light gray color.

The blend is then transferred to a pressure cooker or autoclave, where it is cooked for a period of 2 to 30 minutes, under a pressure of 5 to 100 pounds per square inch, and a temperature between 212° and 337° F. According to the preferred embodiment of the invention, the pressure is kept between 15 and 18 pounds per square inch, for 4 to 6 minutes, at a temperature of 250° F. to 255° F. Although it is possible to cook for a longer time, that is, 30 minutes at a lower temperature, about 212° F., and lower pressure, about 5 pounds per square inch, prolonged cooking is disadvantageous because it affects the honey graham flavor and makes the product more pasty. Cooking is stopped when the material has changed color from light gray to a tan color, at which point the starch is partially gelatinized, to the extent of between 60 and 75%, and the flour has reached the point of incipient cooking.

After the cooking, the moisture content is between 15 and 30%, preferably 20 to 25%. The mass is then passed through a lump breaker, to break the heavy lumps, and transferred to a cooling zone.

Cooling is required to prevent the formation of crusts on the surface of the material, which would interfere with adequate drying in the interior. The cooling unit preferably comprises a long cylinder equipped with a series of internal fins or ribbons. During operation, the cylinder revolves and the fins cause the material to advance, while a continuous blast of cold air is introduced within the apparatus. The material is kept tumbling by the rotation of the cylinder, which prevents it from becoming stuck together.

After the material has been cooled to a temperature of 130°–150° F., the mass is dried until the moisture content ranges preferably between 4 and 8%, although a range of 2 to 10% is still satisfactory. For the purpose of drying, any apparatus of a suitable type may be used, provided the material may be dried in a period of 2 to 3 hours, at a temperature of 200°–250° F., or 48 hours at room temperature, or 45 minutes at 375° F. It is also possible to apply an infrared or high-frequency drying treatment. The high-frequency drying has a favorable influence on the properties of the final product, especially in the first stage of drying, because it avoids the formation of external crusts due to too rapid drying. During the drying and after the drying, lumps, if any, in the granular mass, may be loosened up by means of breakers.

After drying, the material is conveyed to a grinding machine. In the first stage, the major part of the material is ground and in the second stage, the coarser material is removed by screening, so that the fines or dust-like particles are removed. The product with a particle size between 0.2 and 3 mm., preferably between 0.5 and 1 mm., is retained. The material is then ready for packaging. In proper containers, and with a small amount of antioxidants, for instance butylated hydroxy-toluene, commonly called BHT, the cereal product, prepared as described, may be stored for a period of six months, without deterioration. Without antioxidants, the material may be stored for as long as two months, with no loss of the characteristic flavor.

The total sugar content of the material dried to a moisture content between 2 and 10%, is 22 to 26%. If higher concentration of sweetening agents is used in the first step, the total sugar content, after drying, may be as high as 30%.

The cereal product, prepared according to the instant invention, needs between 1 and 4 minutes cooking by the ultimate consumer before eating, depending upon the particle size and individual taste. This final step is preferably conducted by adding one part by volume of the product prepared as described above, to one part by volume of boiling water, stirring and allowing to simmer. The amount of water may be increased to three and one-half parts by volume of water, to one part by volume of cereal. A greater proportion of water, however, and longer cooking, are deleterious, because they tend to destroy the characteristic flavor of the product. The final product has an attractive granular texture, and does not become pasty, even after standing 24 hours.

For the sake of clarity, the following example is described in detail hereinbelow. It will be understood, however, that this example is purely illustrative, and that the invention is not to be considered as limited to the particular ingredients and operating data given therein, the intention being to cover all the modifications and equivalents of the process within the scope of the appended claims.

EXAMPLE 1

To 9 pounds of sugar, in a vessel of capacity 25 gallons, was added 2 pounds of water. To the syrup thus formed, were added 2 pounds of molasses, 2 pounds of liquid honey, 6 ounces of salt and 3 ounces of sodium bicarbonate. The resulting syrup was then added to a blend of 15 pounds of white wheat flour, 15 pounds of whole wheat flour, and 9 ounces of pregelatinized starch. The ingredients were blended by mixing 5 minutes in a planetary mixer, under mechanical stirring at 65 r.p.m. The material, which had acquired a light gray color, was transferred to an autoclave where it was kept 5 minutes under 18 pounds steam pressure, after which the material changed to a light tan color. The temperature of the product, as it emerges from the cooker, was 250° F. The product was cooled to a temperature of 140° F., and then deposited in a moderately thick bed, 1.5–6 inches thick, on a traveling screen and dried in two stages. In the first stage, air at room temperature was applied for 15 minutes, and in the second stage, air at 375° F., was applied for 40 minutes. Moderate vibration was applied during drying, to break up the agglomerates. The product after drying to a moisture content of 6%, was comminuted and the material of particle size between 0.2 and 3 mm. was packaged. The total sugar content was 25.8%.

After boiling in water for two minutes, the product, prepared as described, may be eaten without additional sweetening agent, with or without milk.

The above described process was repeated, using 3 pounds of sorbital and 3 pounds of sugar. The flavor of the finished goods was not substantially affected. In some runs, whole wheat flour was totally eliminated, and substituted with white wheat flour.

The product, prepared as described, is a nutritious breakfast food, with the characteristic honey graham flavor, in spite of the fact that, at no stage, the product or any part of the ingredients have been subjected to baking or toasting. After cooking by the ultimate consumer, the product may be let stand for a period of up to 24 hours. It shows no tendency to lump, nor to become pasty and sticky and maintains the same desirable granular texture and appearance.

On a test panel comprising 25 individuals, 23 of them recognized the typical popular honey graham flavor. Two subjects were pleased with the flavor, but failed to identify it as the graham flavor.

Without in any way limiting the scope of the present invention, by the advancement of theoretical explanations, it is believed that the use of wheat flour rather than wheat kernel, in the manner as described and with the other ingredients at a pH between 6.5 and 8, with sweetening agents in the proportion of at least 27% of the total composition, reduces the cooking time and permits the preparation of the novel product, a breakfast food characterized by the honey graham flavor, by steps other than baking. The product of the invention, when it reaches the ultimate consumer contains sweetening agents in the proportion between 22 and 30% and needs no additional sugar.

Although the invention has been described in detail in the case of wheat, the process of the invention may be applied to other cereal grains such as, for instance, barley and rice. Other embodiments, advantages and features of this invention will be apparent to those in the exercise of ordinary skill in the art, upon the reading of the foregoing specification.

What is claimed is:
1. The process for producing a non-baked, honey-graham flavored quick-cooking cereal from wheat, which comprises the steps of:
   (1) mixing between 8 and 11 parts of sugar, between 3 and 6 parts of liquid honey, between 2 and 4 parts of water, between 0.2 and 0.3 part of salt, to form a syrup and adding to said syrup between 0.1 and 0.2 part of sodium bicarbonate,
   (2) adding said syrup to 30 parts of wheat flour and blending all the ingredients until the material acquires a gray color, the amount of sodium bicarbonate being sufficient to impart a pH between 6.5 and 8 to the total composition,
   (3) cooking for a period of time between 2 and 30 minutes under a steam pressure betwen 5 and 100 pounds and a temperature between 212° and 337° F., until the flour is partially cooked and the starch is partially gelatinized, and the material changes color from gray to tan,
   (4) cooling to a temperature between 130° and 150° F.,
   (5) drying until the moisture content is between 2 and 10% and
   (6) comminuting to a particle size between 0.2 and 3 mm.

2. The process according to claim 1, wherein a binding agent, which is a member selected from the group consisting of starch, and an edible polysaccharide gum, which is selected from the group consisting of plant mucilages, agar, aligin, gum arabic and mixtures thereof, is added to the wheat flour, in amount between 0.3 and 0.6 part prior to adding the syrup from step 1.

3. The process according to claim 1, wherein the pressure during cooking is between 15 and 18 pounds, the length of cooking is between 4 and 6 minutes, and the temperature is between 250° and 255° F.

4. The process according to claim 1 wherein the wheat flour is white wheat flour.

5. The process according to claim 1 wherein the wheat flour is whole wheat flour.

6. The process according to claim 1 wherein one-half of the wheat flour is whole wheat flour and one-half of the wheat flour is white wheat flour.

7. The process according to claim 1 wherein the sugar is partially replaced by sorbitol, in amount of 4–5 parts of sorbitol to 5 parts of sugar.

8. The process according to claim 1 wherein up to one half the amount of said honey is substituted by a member selected from the group consisting of molasses, invert sugar and mixtures thereof.

9. The process according to claim 1, wherein the moisture content after cooking is between 15 and 30%.

10. The process according to claim 9, wherein the moisture content after cooking is between 20 and 25%.

11. The process according to claim 1, wherein 9 parts of sugar, 4 parts of honey, 2 parts of water, 0.2 part of salt, 0.1 part of sodium bicarbonate, are combined to form a syrup in step 1 and said syrup is added in step 2 to a blend from 15 parts of whole wheat flour, 15 parts of white wheat flour, and 0.2 part of a binding agent which is a member selected from the group consisting of starch and an edible polysaccharide gum, which is a member selected from the group consisting of plant mucilages, agar, algin, gum arabic and mixtures thereof, and the cooking in step 3 is conducted for 5 minutes under a pressure of 18 pounds, at 250°–255° F., the cooling is conducted until the temperature is 140° F., drying is conducted until the moisture content is 6%, and the material is comminuted to a particle size between 0.5 and 1 mm.

12. The process according to claim 11 wherein said whole wheat flour is substituted by an equal amount of white wheat flour.

13. The process according to claim 11 wherein said white wheat flour is substituted by an equal amount of whole wheat flour.

References Cited

UNITED STATES PATENTS

| 1,175,407 | 3/1916 | Bright | 99—83 |
| 1,186,768 | 6/1916 | Gould | 99—83 |
| 2,890,118 | 6/1959 | Cantor et al. | 99—83 |
| 2,930,697 | 3/1960 | Miller | 99—80 |
| 3,113,868 | 12/1963 | Lee | 99—83 |

RAYMOND N. JONES, Primary Examiner